United States Patent [19]
Krumrei

[11] Patent Number: 5,566,640
[45] Date of Patent: Oct. 22, 1996

[54] ENCLOSED LITTER BOX DEVICE

[76] Inventor: James W. Krumrei, 5711 Windsong La., Milford, Ohio 45150

[21] Appl. No.: 339,470

[22] Filed: Nov. 14, 1994

[51] Int. Cl.⁶ .................................................. A01K 29/00
[52] U.S. Cl. ............................................................ 119/165
[58] Field of Search .................................. 119/15, 17, 19, 119/165, 161, 706

[56] References Cited

U.S. PATENT DOCUMENTS

| | | |
|---|---|---|
| 2,932,279 | 7/1958 | Giles . |
| 3,738,322 | 6/1973 | Smith . |
| 3,885,523 | 5/1975 | Coleman ................................ 119/165 |
| 3,908,597 | 9/1975 | Taylor . |
| 4,029,048 | 6/1977 | Gershbein . |
| 4,532,890 | 8/1985 | Ohki et al. . |
| 4,552,093 | 11/1985 | Puckett ..................................... 119/17 |
| 4,667,622 | 5/1987 | Breault ................................... 119/165 |
| 4,732,111 | 3/1988 | Runion . |
| 4,858,561 | 8/1989 | Springer ................................. 119/165 |
| 5,092,270 | 3/1992 | Simons et al. ...................... 119/165 X |
| 5,092,277 | 3/1992 | Baillie et al. ......................... 119/15 X |
| 5,134,973 | 8/1992 | Sarullo ................................... 119/165 |
| 5,361,725 | 11/1994 | Baillie et al. ......................... 119/15 X |

FOREIGN PATENT DOCUMENTS 2631211   11/1989   France .

OTHER PUBLICATIONS

Hammacher Schlemmer, Catalog, Spring 1994, p. 35.

*Primary Examiner*—Thomas Price
*Attorney, Agent, or Firm*—Dinsmore & Shohl

[57] ABSTRACT

An improved litter device having an enclosed housing with an opening sized to permit the passage of a pet through the housing opening. The housing is divided into two separate internal chambers with an opening between the chambers also sized to permit passage of a pet. Configured and sized to cover both openings are flexible closure which allow for selective passage of a pet through each individual opening when deflected. When the closure are undeflected, they remain closed to provide an isolated or "dead" air space between the openings by creating an air lock chamber. A slidably removable tray is sized to be received into a tray opening that extends into the second chamber, and is used for holding litter. A deodorizing agent is preferably secured to the interior of the housing for absorbing odors created by the pet excretions.

25 Claims, 3 Drawing Sheets

ENCLOSED LITTER BOX DEVICE

TECHNICAL FIELD OF THE INVENTION

The invention relates to an enclosed litter box device for pets such as cats, and, more particularly, to a litter box involving an air lock chamber disposed between the exterior of the device and a litter box chamber having a slidably removable tray for replacing the litter.

BACKGROUND OF THE INVENTION

As known by owners of small pets, particularly cats, the excretions or waste materials of these animals, such as urine and feces, produce foul odors, especially when permitted to stand for any appreciable amount of time. Many attempts have been made in the art to solve this problem. One of the more popular approaches generally taken has been to attempt to train or encourage the pet to routinely contain these activities in one predetermine place within a dwelling. This approach has been successful to some extent by providing boxes or shallow containers filled with commercially available litter material which tend to absorb the urine and feces, and to that extent, assist in controlling the odors. This approach, however, is not fully effective, and the odor problem may be acute, especially in small confined apartments where the litter box must, by necessity, be located in areas shared with the pets' owners.

Another approach to addressing the odor problem is to train the pet to leave the premises or dwelling prior to excretion. To eliminate the annoyance and inconvenience of having the pet owner open and close the door each time the pet wants in or out, devices, such as a hatch (e.g., see U.S. Pat. No. 3,091,221), a windowgate (e.g., see U.S. Pat. No. 3,499,246), or similar small door apparatus (e.g., see U.S. Pat. No. 3,690,299) permit the passage of a pet out of a dwelling or other structure. These devices are only useful when located at or near ground level, and are not as useful when used in apartments where windows and doors are substantially above ground level, unless a balcony or like exit exists. These types of devices do not confine the pet once it leaves the dwelling, and this risk may expose the pet to danger and injury and may well permit the pet to wander away or otherwise become lost. Typically, these devices are necessarily mounted in a wall of the dwelling which somewhat limits the flexibility of these devices to be moved from one location to another.

Another attempt to solve the odor problem associated with urine and feces excretions and to contain unpleasant odors in a litter box device is disclosed in U.S. Pat. No. 4,029,048 (which issued to Gershbein). The Gershbein device features a housing having an opening large enough for a pet to enter and exit and a flexible closure mounted adjacent to the opening which has flexible sections which overlap sufficiently in a sheet-like fashion to form a wall. The pet can enter through this opening and use the litter tray placed inside the device. Although the device has a closure on the opening, as the pet enters or exits the device through the closure, odor naturally escapes from the device. In addition, the front panel must be pivotally opened for access to the litter tray when cleaning and maintenance is required.

As a consequence, while the problems of odor control and minimization of messes associated with the indoor house pets have been known for many years, attempts to address these shortcomings of available litter services and the like have fallen short.

SUMMARY OF THE INVENTION

Accordingly, it is an object of the present invention to provide a device with both an active and passive means for odor control by providing both a means to absorb odor and a means to keep odor contained in the device.

It is also an object of the present invention to provide a convenient litter box device which effectively addresses the problems and shortcomings heretofore unresolved by prior art devices.

It is another objective of the present invention to provide a device that effectively isolates an otherwise unsightly litter box- and allows placement of the litter box in an area shared by pet owners and pets alike without the associated unpleasant odors.

It is still another object of the present invention to provide a litter device that is simple to manufacture and assemble.

It is still a further object of the present invention to provide a litter device so that indoor pets do not have to leave the dwelling to excrete urine and feces, and that effectively isolates the odor and mess of a litter device from the ambient indoor atmosphere.

It is still a further object of the present invention to provide a litter device whose structure is made of a lightweight material which is resistant to stains and does not absorb odors.

Additional objects, advantages, and other features of the present invention will be set forth and will become apparent through the description that follows, and, in part, will be apparent to those skilled in the art upon examination of the following, or may be learned with practice of the present invention. The objects and variants of the present invention may be realized and obtained by means of the instrumentalities in combinations particularly pointed out in the appended claims.

To achieve the foregoing and other objects, and in accordance with the purpose herein, the present invention is directed to an improved litter device having an enclosed housing with an opening sized to permit the passage of a pet. The housing is divided into two separate chambers with an opening between the chambers also sized to permit passage of a pet. Configured and sized to cover both openings are flexible closure means which allow for selective passage of a pet when deflected, and which automatically close after such passage. When the closure means are undeflected, or closed, they provide an effectively isolated air space between the openings, creating an air lock chamber. A slidably removable tray is sized to be received into a tray opening that extends into the second chamber, and is used for holding litter. In a preferred embodiment, a deodorizing agent can also be secured to the interior of the housing for absorbing odors created by the pet excretions.

BRIEF DESCRIPTION OF THE DRAWINGS

The drawings, incorporated in and forming part of the specification, illustrate several aspects of the present invention, and together with the description, serve to explain the principles of the invention. In the drawings.

Reference will now be made in detail to the present preferred embodiment of the invention, an example of which is illustrated by the attached drawings.

DETAILED DESCRIPTION OF THE PREFERRED EMBODIMENT

Figure 1:
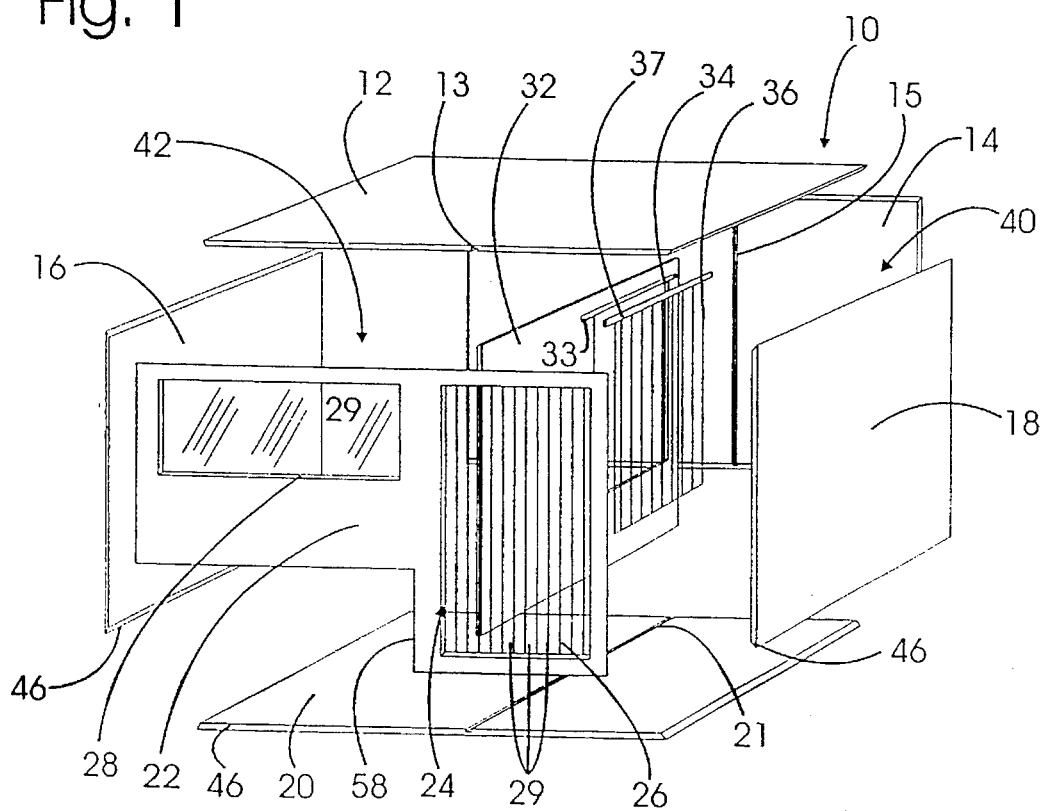
FIG. 1 is a partially exposed perspective view of the housing of an enclosed litter box device made in accordance with the present invention.

Referring now specifically to the drawings in detail, in which identical or similar parts are designated by the same reference number throughout FIG. 1 shows an exploded view housing 11 of an enclosed litter box device of the present invention which is generally designated by 10. The device 10 comprises a substantially enclosed housing 11, comprising a plurality of outside panels, which can be rectangular in shape, as illustrated. The shape of housing 11, however, is not critical and other shapes can be used. In a preferred embodiment, housing 11 comprises a front panel 22 and a back panel 14 spaced rearwardly therefrom, a pair of oppositely disposed side panels 16 and 18, a top panel 12, and a bottom panel 20.

Panels 14, 16, 18 and 22 are preferably thin, flat sheets, each having a rectangular configuration and are made from a lightweight durable material. The material should be generally wear resistant to pet urine and feces, and should be waterproof, easy to clean, resistant to reaction or staining upon extended exposure to urine, feces, or cleaning chemicals, non-toxic, and impervious to the transmission of gases. Pores or similar characteristics should not be present on the surface of the material that would enable the absorption of odors.

From an aesthetic perspective, the panels 14, 16, 18 and 22 are preferably made of a material that has color all the way through and/or that can be painted with an appropriate paint (such as acrylic base) to achieve the desired color and performance characteristics. This is important especially if device 10 is being used in spaces shared with the pet owner. It is, however, preferred that the interior face of panels 14, 16, 18 and 22 be provided in white or similar light color to allow for reflection of light in housing 11, thus making it easier to observe from the exterior, as will be explained below.

In a preferred embodiment, panels 14, 16, 18 and 22 are made from a polyester material such as polyvinylchloride (PVC). An example of a suitable polyvinylchloride having the above-mentioned desired performance and weight characteristics can be obtained from Alucabond in Benton, Ky. under the trademark "Sintra".

Although the dimensions of panels 14, 16, 18 and 22 are not critical, in a preferred example of a device for use as a cat litter box, each of the panels 14, 16, 18 and 22 has a thickness of about 0.25"(6 mm). Front panel 22 and back panel 14 both have a height of approximately 18"(460 mm) and have a width of 27"(690 mm), and side panels 16 and 18 each have a height of about 18"(460 mm) and a length of about 20"(500 mm). In such a preferred arrangement, all the edges (e.g., 46) of panels 14, 16, 18 and 22 are beveled (as shown in FIG. 1) at 45° angles for easy assembly of housing 11 and to provide additional rigidity and strength for housing 11 upon assembly. Additionally, edges 46 can be mitered in a fashion whereby the angles vary from 45° at positions.

Typically, assembly of housing 11 takes place on a hard, flat work surface with wax paper placed on top of the surface so that the surface is not damaged (e.g., keep adhesive from sticking to the surface) or scarred during assembly. Panels 14, 16, 18 and 22 are joined together at their respective side edges, as shown in FIG. 1, forming corners with the adjacent panels at a 90° angle to each other. It is preferred that the housing 11 be pre-assembled first by fitting the panels (e.g. 14, 16, 18, and 22) together at their respective edges without a permanent adhesive before permanent attachment. A non-permanent adhesive, such as tape, can be used during preassembly to assist in temporarily holding the edges of the panels 14, 16, 18 and 22 together so the assembler becomes familiar with the various components of housing 11. To assemble the panels 14, 16, 18 and 22, a permanent adhesive is preferably applied to the side edges (e.g., 46) of the panels, and after application of the permanent adhesive, the respective side edges of the panels are fitted together again forming a corner with the adjacent panels have a 90° angle respective to each other.

A non-permanent adhesive can be used to hold other side panels in place with each other while permanent adhesive sets and hardens.

In an alternative embodiment, the edges of panels 14, 16, 18 and 22 are provided in a mitered edge configuration (e.g. lock or stepped). The joints should also be pre-assembled first without using a permanent adhesive to ensure that the edges properly fit together to form a 90° angle corner. To assemble panels, a permanent adhesive is applied to the surface of the slots only and then the rib should be fitted therein to form the corner.

Permanent adhesives which can be used with panels formed of PVC or the like can be a glue such methylethyketone ("MEK"), cyanoacrylate (also known as "superglue"), or other permanent adhesives known in the art that will provide sufficient rigidity and strength to hold the edges of panels 14, 16, 18 and 22 together. These adhesives can also help to provide substantially air tight seals along assembled edges of the housing, which will help in maintaining odors and mess within the device during use. An assembly or fixture template can be used to assist in assembly of housing 11, where mass assembly operations are desired. The template allows panels 14, 16, 18 and 22 to be assembled in a substantially rectangular shapes so that adjacent panels form corners with a relatively accurate and consistent 90° angle respective to the adjacent panel. Once panels 14, 16, 18 and 22 are assembled, a bead of permanent adhesive or sealant can preferably be applied to the interior side edges of housing 11 to provide additional strength and rigidity, and to imperviously seal housing 11 from transmission of fluids.

As mentioned above, housing 11 has a bottom panel 20 which preferably comprises a thin flat sheet having a rectangular configuration to serve as a base for housing 11. Preferably, the edges of bottom panel 20 are also mitered substantially similar to the edges of panels 14, 16, 18 and 22 so that bottom panel 20 can be attached and secured to the bottom edges of panels 14, 16, 18 and 22. Limited by the dimensions of panels 14, 16, 18 and 22, in a preferred example, bottom panel 20 has a thickness of about 0.25"(6 mm), has a width of about 27"(690 mm), and has a length of about 20"(500 mm).

Further assembly of housing 11, is accomplished by permanently securing bottom panel 20 to the bottom edges of panels 14, 16, 18 and 22. It is preferred that bottom panel 20 be pre-assembled first by aligning the edges of bottom panel 20 with the bottom edges of panels 14, 16, 18 and 22. Again, a non-permanent adhesive is used to hold housing 11 and bottom panel 20 together at the respective edges. To attach and secure bottom panel 20 to the bottom edges of panels 14, 16, 18 and 22, a line of permanent adhesive is applied along the edges of bottom panel 20 where corners are formed between panels 14, 16, 18 and 22 and bottom panel 20. As with assembly of panels 14, 16, 18 and 22, a non-permanent adhesive can be used to hold the housing 11 together while the permanent adhesive sets and hardens. Once bottom panel 20 is attached, a line of permanent adhesive can be applied to the interior bottom edges to provide additional strength and rigidity, and to imperviously seal housing 11 from the transmission of fluids. Obviously, methods other than solvent type adhesives could be used to assemble and attach the various panels of the present invention. For example, appropriate clips or screws could be used along with sealing compound to provide the fluid impervious connections desired.

A partition panel 32 is provided having a second opening 34 and is sized to fit longitudinally between side panels, 16 and 18, thus defining separate first and second chambers 40 and 42, respectively, within the housing 11. Additionally, a transverse groove 33 is provided on either face of partition panel 32 running adjacent to the top of opening 34 and will be discussed in further detail later. Partition panel 32 is also illustrated as being a thin flat sheet having a rectangular configuration, but does not have beveled edges. It is preferred that partition panel 32 be made from substantially the same material as panels 14, 16, 18 and 22, and bottom 20. Preferably, partition panel 32 has the same thickness as panels 14, 16, 18 and 22, has a length of about 19"(490 mm) and a height of about 17"(450 mm) to fit snugly within housing 11 between front and back panels 22 and 14, respectively.

Figure 4:
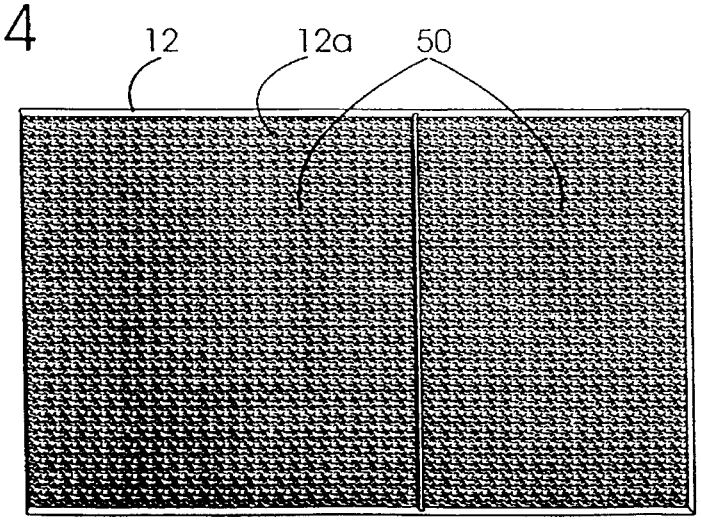
FIG. 4 is an enlarged plan view of the inside surface of the top panel showing an absorbent means affixed thereto.

To further assemble housing 11, the vertical edges of partition panel 32 are inserted into groove 15, which runs longitudinally along the interior face of back panel 14, as shown in FIG. 1, groove 21, which runs longitudinally along the interior face of bottom panel 20, a corresponding groove (not shown), which runs longitudinally along the interior face of front panel 22, and groove 13, as shown in FIG. 4, on the inner surface of top panel 12. It should be noted that these grooves are not required in the present invention, and are provided to indicate where partition panel 32 is to be inserted and so that partition panel 32 is more easily maintained in a substantially vertical position. The grooves are configured to receive the vertical edges of partition panel 32 so at to maintain the partition panel 32 in a substantially vertical position upon assembly. The grooves are also preferred to augment the rigidity of housing 11, and to facilitate the provisions of a fluid tight seal between partition panel 32 and the front and back panels 22 and 14. In a preferred embodiment, the longitudinally running grooves (e.g. 13, 15 and 21) are spaced along panels 12, 14, 20 and 22, a distance of about 15.50"(395 mm) from side panel 16, and each has a width of 0.25"(6 mm) and a depth of about 0.125"(3 mm) to receive the partition panel 32. A permanent adhesive, such as the type described above, is applied to both vertical edges and the lower horizontal edge of partition panel 32 to securely hold partition panel 32 in place in housing 11 and to provide a substantially fluid tight seal.

First chamber 40, defined in housing 11 by partition panel 32, must be of sufficient dimension (e.g., length, width and height) so that a pet, such as a cat, can enter through first opening 24 and be completely and comfortably within chamber 40, so that first closure 26 returns to an undeflected or closed position, and such that second closure 36 is still in an undeflected position. Section chamber 42, also defined in housing 11 by partition panel 32, must be of sufficient dimension (i.e., length, width and height), so that a pet can fit completely and comfortably within the second chamber 42 to excrete urine or feces within second chamber 42, bury the excretions, turn around and exit second chamber 42. These requirements can be achieved by appropriately sizing the panels 14, 16, 18 and 22, and by properly positioning partition panel 32, as described above.

Figure 5:
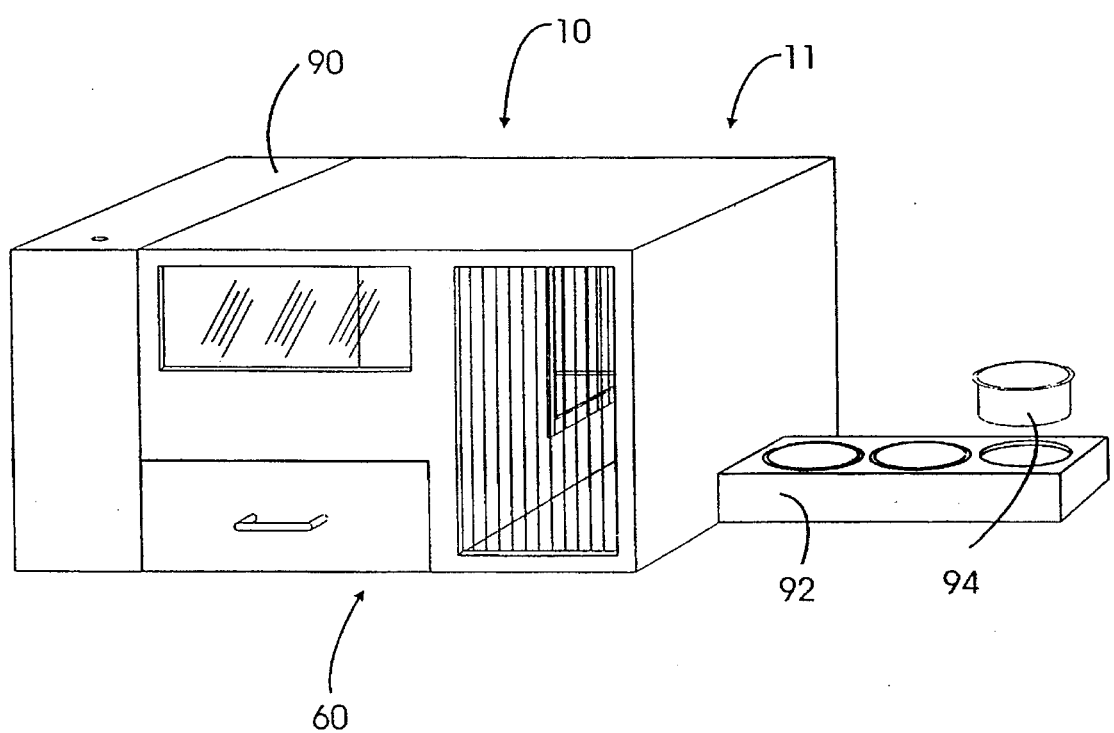
FIG. 5 is a perspective view of the device of FIG. 3, shown with an optional modular storage box and bowl tray arrangement.

FIGS. 1 and 5 illustrate a preferred embodiment in which housing 11 comprises a top panel 12 which can also be a thin flat panel covering the entire housing 11. Preferably, top panel 12 is made from substantial similar materials as the materials used for bottom panel 20, and can have substantially the same mitered edges and dimensions as well. Top panel 12 fits together with the upper edges of panels 14, 16, 18 and 22 to form an effective seal which will help contain odors within housing 11. It is preferred that top panel 12 not be permanently affixed to housing 11 during assembly so that top panel 12 can be removed from the housing 11 with relative ease for maintenance and cleaning, easily removing of closures 26 and 36, removing a pet from the housing 11, or replacing a deodorizing agent (e.g. 50, shown in FIG. 4) and which will be discussed later. FIG. 4 illustrates groove 13 provided in the inner surface of top panel 12 which is sized and configured to receive the top edge of partition panel 32, as discussed previously.

As mentioned, front panel 22 is preferably provided with a first opening 24 that is sized to permit the passage of a pet from outside housing 11 into first chamber 40. Preferably, first opening 24 has a width of about 15.35"(390 mm) and a height of about 5.2"(32 mm) for applications for casts. It is contemplated that side panel 18 or back panel 14 can be provided with first opening 24 in lieu of front panel 22 to permit passage of a pet into first chamber 40.

A first closure 26 can be provided to completely cover opening 24 and prevent odors in first chamber 40 from escaping from housing 11. A flexible closure can preferably be used for this purpose, but the closure 26 should be configured so as to create an effectively isolated air space in first chamber 40 that assists in preventing significant direct air flow from the second chamber 42 to areas outside housing 11. The isolated air space created in first chamber 40 is a "dead air" zone that holds the odors in housing 11 a sufficient period of time so the odors can be absorbed by a deodorizing agent, discussed in detail later. Also, closure 26 needs to be flexible enough to allow for selective and convenient passage of a pet. To achieve this dual purpose, closure 26 preferably comprises a plurality of 1" (2.54 cm) overlapping strips 29, with each strip positioned to run longitudinally with the adjacent strips and to overlap the adjacent strip by approximately ½" (1.27 cm) to form a curtain or wall, when the strips are undeflected. The strips 29 should also be made from materials that do not react to urine or feces, and should be of such a thickness that it cannot be easily torn by pet's claw or chewed on in a pet's mouth. Preferably, the material is a 4 mil transparent polyester that allows for a maximum amount of light to pass into housing 11. The top end of the strips are preferably attached and secured to a cross beam (e.g., 27) to hold their longitudinal configuration. Preferably, the closure 26 has a height of about 17" (432 mm) and a width of about 12" (305 cm), and cross beam 27 has a width of 0.24" (6 mm), a depth of 0.12" (3 mm), and a length longer than the width of opening 24.

Closure 26 can be secured to the inside face of front panel 22 by inserting cross beam 27 into a transverse groove (not shown), adjacent to the top edge of opening 24, which is sized and configured to receive beam 27. Preferably, transverse groove has a width of 0.24" (6 mm) and a depth of 0.12" (3 mm) to receive cross beam 27 in a flush fit (e.g. fit snugly within a recess). Cross beam 27 should be secured using a non-permanent adhesive, such as tape and/or a snap-type fit so that the closure 26 can be replaced or removed for cleaning, if desired. Additionally, it is advantageous for closure 26 to be removable so that a pet can be initially trained to use device 10 without closure 26 inhibiting free access through opening 24.

A second closure 36 can be provided to completely cover opening 34 to prevent odors in second chamber 42 from escaping housing 11 through first chamber 40 and first opening 24. Furthermore, the potentially stronger odors in second chamber 42 are further isolated from the ambient air outside device 10 a sufficient period of time so odors are absorbed by a deodorizing agent as well. Any flexible closure can be used for this purpose. Ideally, closure 36 is substantially similar to first closure 26, as described above, and includes a crossbeam 37, sized and configured similar to beam 27. However, one important difference between second closure 36 from first closure 26 is that closure 36 is preferably shorter in length. This difference in length is due to a shorter height of second opening 34 from first opening 24. Additionally, it is preferred that the lower end of closure 36 is kept above the top of tray 60 so as not touch the litter in tray 60. Preferably, the second closure 36 has a height of about 12"(315 mm) and a width of about 8.9"(225 mm).

Closure 36 can be secured to either face (i.e., within the latter chamber or within the air lock chamber) of partition panel 32. For illustrative purposes only, closure 36 is removably secured to the face of partition panel 32 in first chamber 40, as shown in FIG. 1. Closure 36 is preferably secured to the face of partition panel 32 in substantially the same manner as was used to secure first closure 26 to the inside surface of front panel 22. Accordingly, a transverse groove 33, as shown in FIG. 1, which is configured similar to the transverse groove (not shown) of front panel 22, is adjacent to the top edge of second opening 34 running longitudinally along the width of opening 34. Again, it is preferred not to permanently secure second closure 36 to partition panel 32 so that closure 36 can be replaced, if desired. Additionally, it is advantageous for closure 36 to be removable so that a pet can be initially trained to use device 10 without closure 36, and for that matter, closure 26 inhibiting free access through both openings 24 and 34 respectively. It is contemplated that one or both of the closures (26/34) might alternatively be attached to top panel 12 for removal and cleaning with the housing top.

It is preferred that the configuration of the first opening 24 and second opening 34 be offset and/or spaced part such that a pet cannot deflect both the first closure 26 and the second closure 36 at the same time. This configuration of openings 26 and 36 assists in maintaining the effective air lock created in first chamber or air lock chamber 40, preventing direct fluid communication between the second or litter chamber 42. This allows for odors to be held in housing 11 (both the first and second chambers 40 and 42 respectively) for a sufficient period of time for odors to be absorbed.

Front panel 22 is also provided with a window opening 28, as shown in FIG. 1, so that a transparent window 29 (not shown) can be installed which allows light to shine into the second chamber 42. The window 29 should be made from a scratch resistant, non-yellowing material such as 3 mm acrylic. Installation of a transparent window allows a pet's activity and/or the general environment in the second chamber 42 to be viewed from outside the housing 11 without removing top 12. The window is preferably sized larger than window opening 28 and installed by applying a non-permanent adhesive, such as clear adhesive tape, along the peripheral edges of window 29 and placing window 29 on the inside face of front panel 22 to completely cover opening 28. It is important that the window should form an effective fluid seal between the housing 11 and the area outside housing 11. A permanent adhesive can be used in lieu of a non-permanent adhesive, but use of a permanent adhesive can make replacing windows 29 difficult as it becomes worn and yellowed through use. It is contemplated that side panel 18 and/or back panel 14 can be provided with window opening 28 for a window 29 in additional to front panel 22 and/or in lieu of front panel 22.

Figure 2:
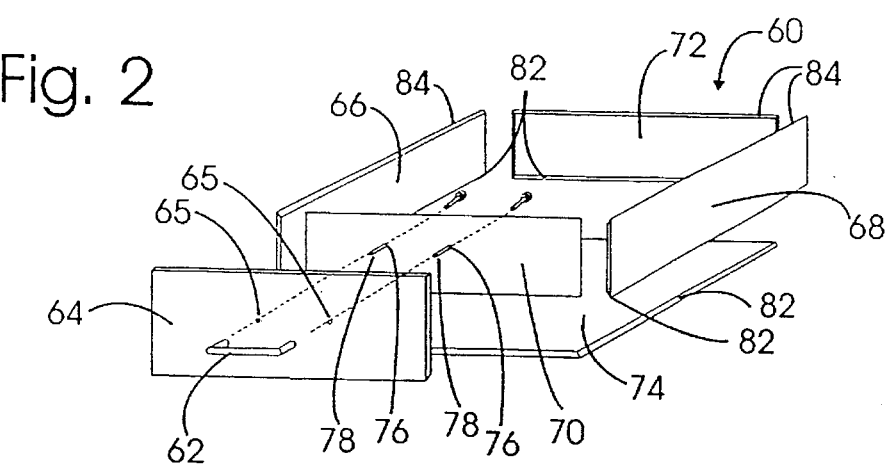
FIG. 2 is an exploded perspective view of a slidably removable tray which can preferably be used with a housing as shown in FIG. 1.
Figure 3:
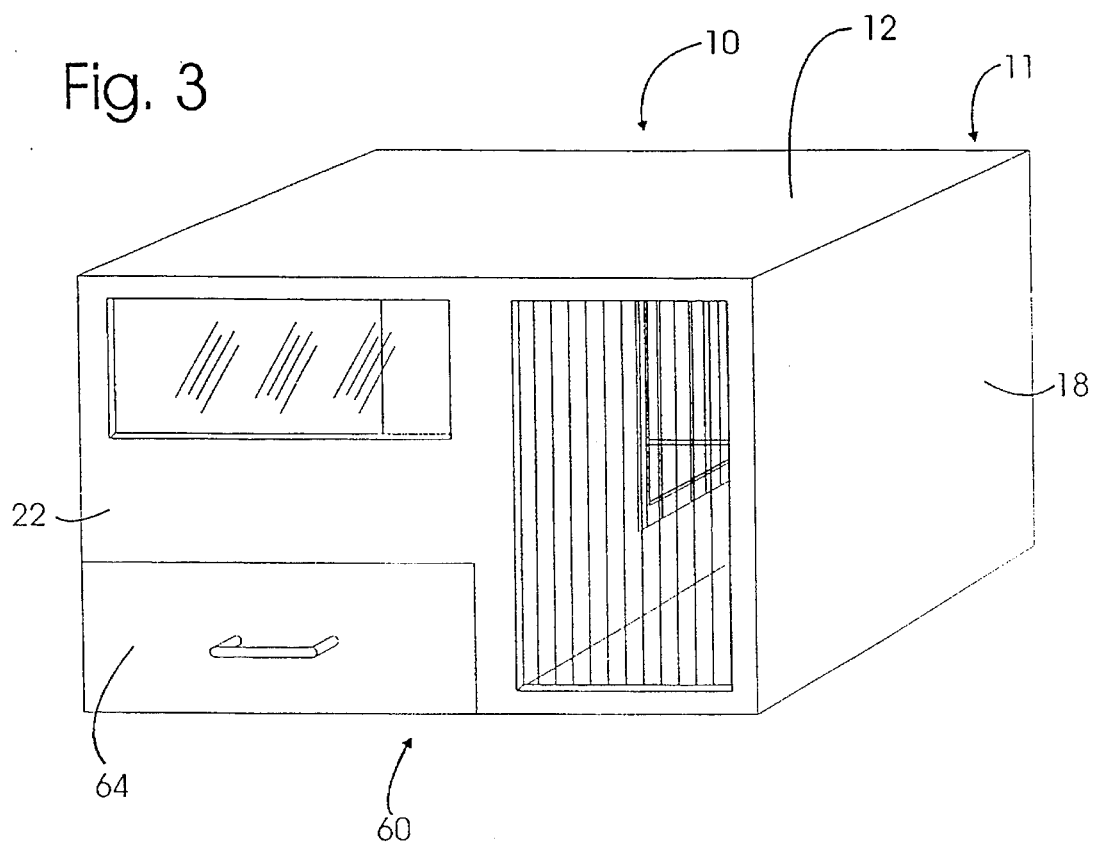
FIG. 3 is a perspective view of a litter box device the present invention after the housing and tray elements of FIGS. 1 and 2 have been fully assembled.

Front panel 22 is also preferably provided with a tray opening 58 that is sized to slidably receive a tray (generally designated by the number 60, in FIG. 2). It is contemplated that side panel 16 or back panel 14 can be provided with tray opening 58 in lieu of front panel 22. Typically, tray 60 is rectangular in shape, however, the shape of tray 60 is not critical and other shapes can be provided, so long as the tray 60 is slidably removable from housing 11 through a tray opening 58. Tray 60, as shown in FIG. 2, has a front panel 70 and a back panel 72 spaced rearwardly therefrom, and a pair of oppositely disposed side panels 66 and 68. Preferably, the edges (e.g.,82) of panels 66, 68, 70 and 72 are beveled along the edges at 45° angles for easy assembly and to provide additional strength and rigidity to tray 60, as described above with respect to housing 11.

Assembly of tray panels 66, 68, 70 and 72 and bottom panel 74 is completed following substantially the same steps as were used to construct panels 14, 16, 18, 22, and 20 of housing 11, as discussed above. Furthermore, tray 60 is preferably constructed from substantially the same materially as housing 11. The top vertical (e.g., 84) edges of tray 60 are beveled at an angle, preferably a 45° angle so that sand or litter resting on these edges or kicked up during use of tray 60 is likely to fall back into tray 60.

Front panel 70 is provided with holes 76 formed completely through said panel 70 and sized to receive the end of screws 78, shown in FIG. 2, for attachment of handle 62. Tray 60 further comprises door 64 which is a flat rectangular panel made from substantially the same material as housing 11 and sized and configured so that an effective air seal is formed between housing 11 and tray 60. Holes 65 are also formed completely through door 64 and have substantially the same diameter as holes 76. It should be noted that other types of handles can be used with the present invention and use of other types of handles would alter the holes in front panel 70 and door 64.

The dimensions of tray 60, as disclosed above, are selected so that the tray 60 is sized to be closely yet slidably fitted in opening 58, so that door 64 and front panel 22 fit together to form an effective fluid tight seal, and so that side panels 66 and 68 and back panel 72 fit securely in opening 58 and so that there is no space for litter to fall between the inside face of housing 11 and the outside face of tray 60. The height of tray 60 is selected to provide sufficient depth in order to receive an adequate quantify of conventional litter material, such as 10 lbs. (4.55 kg) of conventional cat litter having a height of about 1.5" (38.10 mm). On the other hand, the height of tray 60 should be low enough not to interfere with the movement of a pet through opening 34. In a preferred embodiment for cat litter applications, the tray 60 has a height of about 3.9" (100 mm), a width of about 15" (380 mm), and a length of about 18.75" (480 mm).

In order to further reduce the odor created by pet excretions in device 10, a deodorizing agent can be incorporated into housing 11 which absorbs odor. The deodorizing agent should be non-toxic so that it is not harmful to the pet's health if accidentally ingested. In a preferred embodiment, the deodorizing agent is zeolite crystals, which absorb moisture and odor in housing 11. FIG. 4 illustrates zeolite crystals 50, which are commonly available, that are preferably secured to the inner surface of top panel 12 using a permanent adhesive, such as the type described to assemble housing 11 and tray 60. Ideally, the zeolite crystals have a pore size that absorbs the odor created by urine, feces, and moisture trapped in device 10, such as between about 3 and about 10 angstroms for cat litter applications. The zeolite crystals do not need to be replaced when the pores are filled, but instead, the pores need to be completely cleaned our or rejuvenated. This can be accomplished, as needed, by removing top panel 12 from housing 11, and placing it along with its zeolite crystals in a heating element, such as an oven, a microwave or the sun. Preferably, the zeolite crystals are positioned facing toward the sun for approximately six hours.

The deodorizing agent can also comprise an activated charcoal filter attached to the interior of housing 11 to absorb associated with a litter box. Activated charcoal filters should not be permanently affixed to the housing 11 since the charcoal filters are not reusable and must be replaced when worn out.

FIG. 5 illustrates an alternative embodiment of device 10 that is configured for the optional addition of a storage box 90 or tray 92 for bowls 94. The storage box 90 is a completely enclosed free standing structure that can be attached to either side of the housing 11 used to store litter, food, and can be divided into multiple compartments so that both litter, food, or other supplies can be stored therein. Opening 96 can be provided in the lid of box 90 as a means for removing the lid. Box 90 is constructed in substantially the same manner as housing 11. Also, a tray 92, with openings, preferably round, sized and configured to receive bowls 94, can be provided that attaches to one of the side panels (e.g. 16 or 18). Storage box 90 and tray 92 are made from material substantially identical to the material used for housing 11 or tray 60. Any types of conventional bowl can be used with tray 92.

It will be understood that in lieu of piecemeal construction and assembly of the elements of the present invention, housing 11 and/or tray 60 could be provided as a unitary structure or as segmented components, and manufactured using die casing techniques, blow molding techniques or other techniques known in the industry for quickly and inexpensively producing large quantities of the present invention in a short amount of time.

Having shown and described the preferred embodiment of the present invention in detail, it will be apparent that modifications and variations by one of ordinary skill in the art are possible without department from the scope of the present invention to find any appended claims. Several potential modifications have been mentioned and others will be apparent to skilled in the art. For example, it should be understood that the components, such as the storage box 90 and tray 92 can be added to different configurations of device 10, as shown in FIG. 5. It might also be desirable to include one more one-way (e.g. inlet only) air inlet devices to ensure that fresh air can easily enter the otherwise "dead air" spaces within the litter chamber and/or the air lock chamber of the present invention. As also understood, the housing of the present invention can include additional chambers, as desired. Accordingly, the scope of the present invention should be considered in terms of the claims and is understood not to be limited to the details of structure operation shown and described in the specification and drawings above.

What I claim is:

1. A litter device comprising:

an enclosed housing defined by a plurality of outside panels, wherein one of said panels comprises a first opening sized to permit the passage of an animal therethrough;

first and second chambers within said housing separated by a partition panel, said first opening providing access to said first chamber, and said partition panel provided with a second opening sized to permit the passage of an animal therethrough to said second chamber; and flexible closure means located adjacent each of said first and second openings for allowing selective passage of an animal through each of said openings, said closure means normally closing said respective opening to provide an effectively isolated air space between said openings and preventing air flow between said openings.

2. The device of claim 1 wherein said housing includes a removable top panel.

3. The device of claim 2 wherein said housing further comprises a deodorizing agent secured to the interior of said housing.

4. The device of claim 3 wherein said deodorizing agent is zeolite crystals.

5. The device of claim 3, wherein said deodorizing agent comprises zeolite crystals attached to said housing.

6. The device of claim 5 wherein said deodorizing agent is zeolite crystals.

7. The device of claim 6 wherein said zeolite crystals are attached to a removable top panel.

8. The device of claim 1, wherein said first and second openings are located relative to one another in a manner which prevents an animal from simultaneously opening both of said openings.

9. The device of claim 1 wherein said closure means are removable.

10. The device of claim 8 wherein said first and second openings are placed from one another so that said first and second closure means are displaced at a different time as an animal passes therethrough.

11. The device of claim 1 wherein said tray includes edges beveled at an angle to facilitate the litter falling back into said tray.

12. The device of claim 1 wherein one of said outside panels is provided with a window opening sized for installation of a transparent window.

13. The device of claim 1, wherein said housing further comprises a means for holding litter.

14. The device of claim 13, wherein said means for holding litter comprises a slidably removable tray.

15. The device of claim 14, wherein said removable tray extends rearwardly from an outside panel of said housing and into said second chamber for holding litter for use within said housing.

16. A litter device comprising:

an enclosed housing made of polyester having a first panel provided with a first opening sized to permit the passage of an animal therethrough; first and second chambers within said housing separated by a partition panel, said first opening providing access to said first chamber, and said partition panel provided with a second opening sized to permit the passage of an animal therethrough to said second chamber, said first chamber being large enough for an animal to fit completely therewithin and said second chamber being large enough for an animal to excrete feces or urine and be able to turn around after entering for exiting through said second opening and a removable top panel which forms an effective air seal to enclose said housing;

flexible closure means located adjacent each of said first and second openings for allowing selective passage of an animal through each of said openings, said closure means normally closing said respective opening to provide an isolated air space between said openings and preventing direct air flow movement between said second chamber and outside of said housing; and a deodorizing agent secured to the interior of said housing.

17. The device of claim 8, wherein said first and second openings are located relative to one another in a manner which prevents an animal from simultaneously opening both of said openings.

18. The device of claim 8 wherein said first and second openings are spaced from one another so that said first and second closure means are displaced at a different time as an animal passes therethrough.

19. The device of claim 16, wherein said housing further comprises a slidably removable tray.

20. The device of claim 19, wherein said removable tray extending rearwardly from said first panel of said housing, said tray extending into said second chamber and holding litter for use with said housing, said slidably removable tray is sized to fit snugly into said second chamber and said tray having upper edges beveled at an angle to facilitate litter displaced from said tray falling back into said tray.

21. A litter device comprising:

an enclosed housing defined by a plurality of outside panels, wherein one of said panels comprises a first opening sized to permit the passage of an animal therethrough;

first and second chambers within said housing separated by a partition panel, said first opening providing access to said first chamber, and said partition panel provided with a second opening sized to permit the passage of an animal therethrough to said second chamber, said first and second openings positioned and configured relative to one another in a manner which prevents an animal from simultaneously opening both of said openings;

a slidably removable tray extending rearwardly from an outside panel of said housing and into said second chamber for holding litter for use within said housing; and flexible closure means located adjacent each of said first and second openings for allowing selective passage of an animal through each of said openings, said closure means normally closing it respective opening to provide an isolated air space between said openings and preventing air flow between said openings.

22. The device of claim 21 wherein said housing includes a removable top panel.

23. The device of claim 22, wherein said housing further comprises a deodorizing agent secured to the interior of said housing.

24. The device of claim 23 wherein said deodorizing agent is zeolite crystals.

25. The device of claim 21 wherein said first and second openings are spaced from one another so that said first and second closure means are displaced at a different time as an animal passes therethrough.

\* \* \* \* \*

UNITED STATES PATENT AND TRADEMARK OFFICE
CERTIFICATE OF CORRECTION

PATENT NO. : 5,566,640
DATED : October 22, 1996
INVENTOR(S) : James W. Krumrei

It is certified that error appears in the above-indentified patent and that said Letters Patent is hereby corrected as shown below:

In claim 6, line 1, replace "5" with --16--.
In claim 11, line 1, replace "1" with --14--.
In claim 17, line 1, replace "8" with --16--.
In claim 18, line 1, replace "8" with --16--.

Signed and Sealed this

Fifteenth Day of April, 1997

Attest:

BRUCE LEHMAN

*Attesting Officer*     *Commissioner of Patents and Trademarks*